United States Patent
Sargent, III et al.

Patent Number: 5,320,515
Date of Patent: Jun. 14, 1994

[54] APPARATUS FOR DEFACING COMPACT DISCS

[75] Inventors: George W. Sargent, III, Carrollton; Paul J. Kucsera, Villa Rica, both of Ga.

[73] Assignee: Sony Music Entertainment Inc., New York, N.Y.

[21] Appl. No.: 9,054

[22] Filed: Jan. 26, 1993

[51] Int. Cl.$^5$ ............................................. B29C 59/00
[52] U.S. Cl. .................................. 425/385; 425/810; 264/106; 264/293
[58] Field of Search ............... 425/385, 371, 362, 363, 425/810, 335, 289, 373, 374, 304, 312, 294, 298, 370; 264/293, 284, 139, 160, 162, 106, 107

[56] References Cited

U.S. PATENT DOCUMENTS

| | | | |
|---|---|---|---|
| 2,169,505 | 8/1939 | Sherman | 425/335 |
| 2,265,032 | 12/1941 | Feyrer | 425/810 |
| 2,611,927 | 9/1952 | Roberts et al. | 264/293 |
| 2,663,050 | 12/1953 | Helm, Jr. | 264/293 |
| 3,312,583 | 4/1967 | Rochlis | 425/373 |
| 3,323,983 | 6/1967 | Palmer et al. | 162/362 |
| 3,773,455 | 11/1973 | Warp | 425/294 |
| 3,837,781 | 9/1974 | Lambertus | 425/373 |
| 3,882,207 | 5/1975 | Hannan et al. | 264/284 |
| 4,033,709 | 7/1977 | Kroyer | 425/363 |
| 4,061,458 | 12/1977 | Mundus et al. | 425/395 |
| 4,615,671 | 10/1986 | Bernal | 425/289 |
| 4,645,701 | 2/1987 | Zarrow | 428/120 |
| 4,931,770 | 6/1990 | Abramson | 340/541 |
| 4,950,442 | 8/1990 | Tanimoto et al. | 264/293 |

Primary Examiner—Jay H. Woo
Assistant Examiner—Duane S. Smith
Attorney, Agent, or Firm—Rosenman & Colin

[57] ABSTRACT

A system for defacing compact discs so as destroy information stored thereon includes a defacer unit and a feed unit for feeding discs one at a time, with vertical orientation, to the defacer unit. A falling vertically-oriented disc is caught and held between two sets of driven endless rubber belts which transport the disc between opposed knurling wheels which embed grooves in opposite sides of the disc substrate without, however, cracking the substrate. The knurling wheels are designed to give the grooves an identifiable pattern.

12 Claims, 4 Drawing Sheets

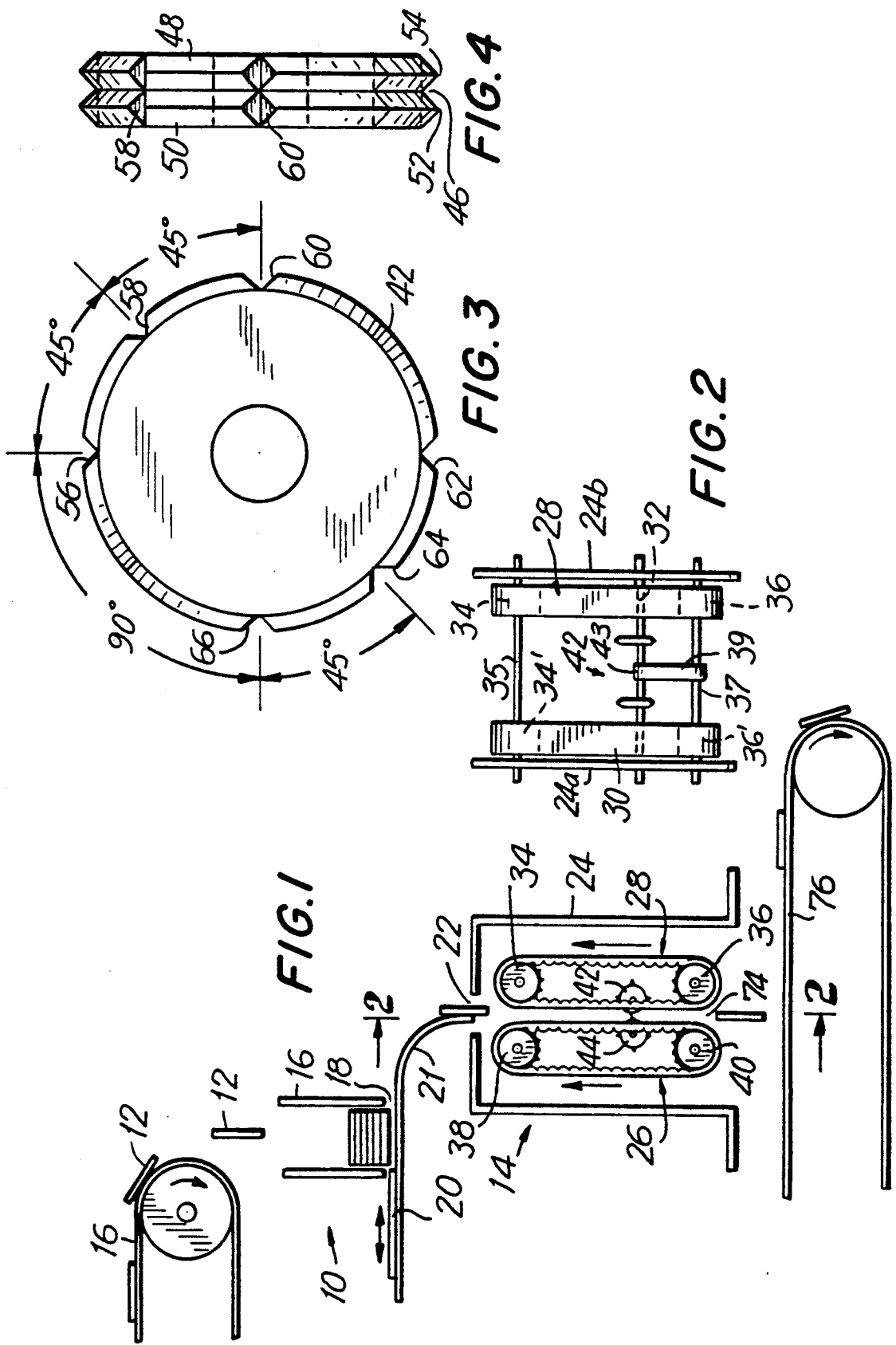

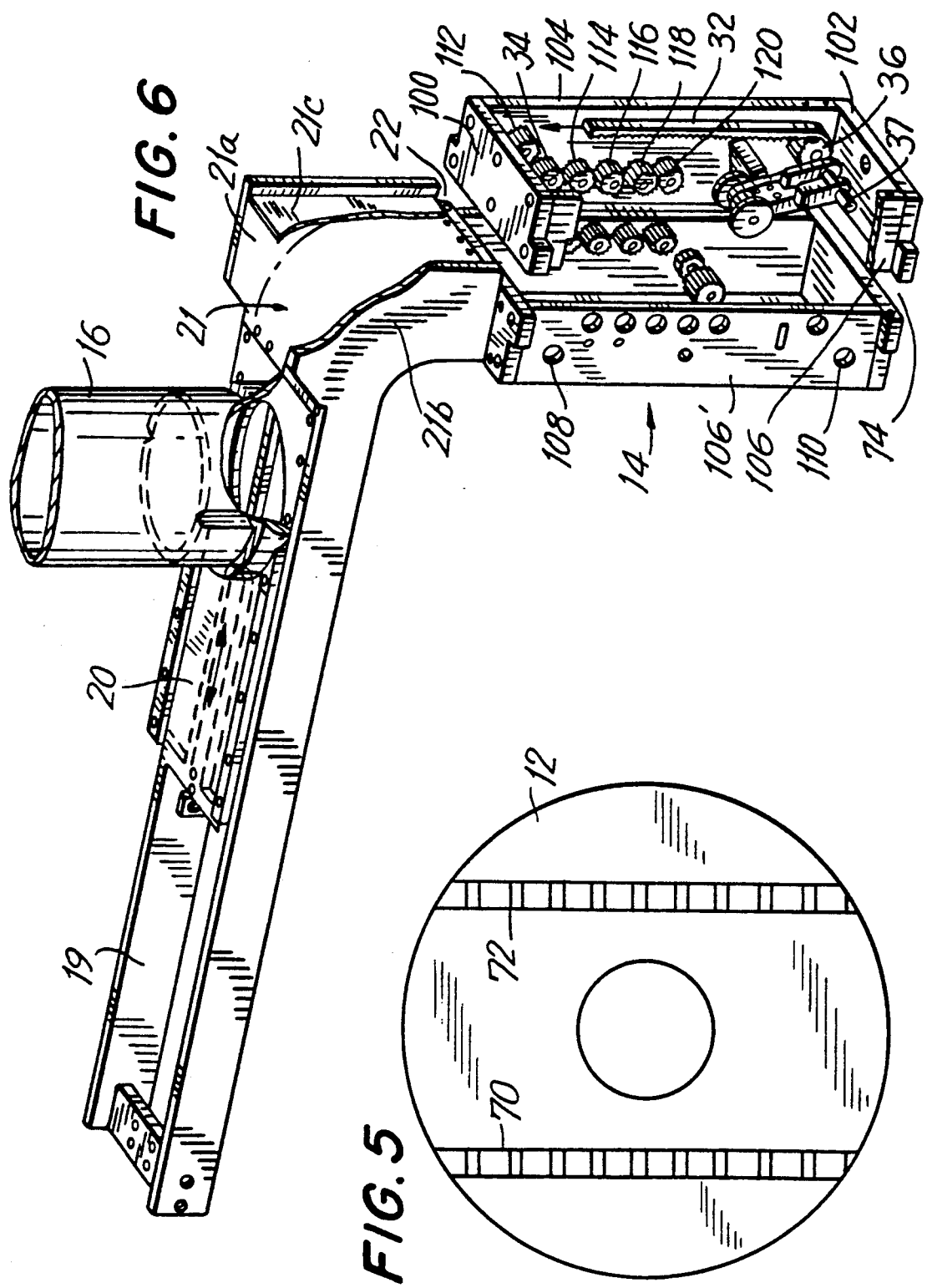

APPARATUS FOR DEFACING COMPACT DISCS

BACKGROUND OF THE INVENTION

This invention relates to apparatus for destroying information recorded on a compact disc so as to prevent its reproduction. More particularly, the invention is concerned with apparatus for defacing compact discs to render them unplayable, without cracking or destroying the disc substrate.

As is well known, the compact disc is an increasingly popular medium for the replication of audio programs. As currently manufactured, the compact disc comprises a thin circular polycarbonate substrate approximately 4¾ inches in diameter having a central aperture adapted to be received on the centering mechanism of a disc player. Usually, the disc has digitally encoded information on one surface thereof which is adapted to be laser-read by the disc player. The information-bearing surface of the substrate is coated with a thin film of aluminum which, in turn, is covered with a protective lacquer coating, of which two types are currently in common use. One is a cellulose nitrate based material in a suitable solvent such as toluene, and the other is an ultraviolet cured acrylic based material. Information regarding the programs recorded on the disc is printed in ink on the lacquer coating.

In the course of manufacture and distribution of such compact discs, many may be scrapped as production rejects, or may be returned to the manufacturer as a consequence of inventory obsolescence or other reasons. This presents a serious problem of disposal, as well as a problem of insuring that such discs, particularly the returns, are not re-introduced into the channels of commerce through theft, for example, while awaiting disposal. The illicit distribution of recorded information is widespread in the entertainment industry, and very large revenues would be lost by a record company through the unauthorized distribution of such returned discs, to say nothing of the damage to its reputation should production rejects find their way into distribution channels.

While these problems could be solved by cracking, crushing or otherwise destroying the mechanical integrity of returned or rejected discs and discarding the resulting waste product in a landfill, the polycarbonate discs, provided the coatings are removed, have sufficiently high scrap value as to justify removal of the coatings to reclaim the polycarbonate, which is best done if the disc is unbroken. However, removal of the coatings is preferably done by a batch process, which may result in temporary accumulation of discs in sufficient numbers to be attractive to a thief.

A primary object of the present is to provide a means for defacing at least the information-bearing surface of a compact disc to render it unplayable.

Another object of the invention is to provide means for rendering a compact disc unplayable without cracking or destroying the polycarbonate substrate.

Still another object of the invention is to provide apparatus for defacing compact discs with identifiable markings for facilitating determination of the source of defaced discs that may illicitly find their way into distribution channels.

SUMMARY OF THE INVENTION

Briefly, the apparatus for defacing compact discs to render them unplayable, without cracking or destroying the polycarbonate substrate, includes a defacing unit and a feeder unit for feeding discs, one at a time, to the defacing unit. The feeder unit includes a conveyor which drops the discs into a vertically-oriented tube in which they are stacked. One disc at a time is ejected from the bottom of the stack, through a narrow slot in the tube, and then drops with vertical orientation into the defacing unit. The defacing unit receives the vertically-oriented disc between two sets of driven rubber belts which engage opposite sides of the disc and pulls it between opposed knurling wheels which mark opposite sides of the disc with embedded grooves having an identifiable design. The knurling wheels are mounted on a suspension system which controls their penetration to a depth to render the disc unplayable yet preventing cracking of the disc substrate.

BRIEF DESCRIPTION OF THE DRAWINGS

Other objects, features and advantages of the invention will become apparent, and its construction and operation better understood, from the following detailed description when read with reference to the accompanying drawings, in which:

FIG. 1 is a diagrammatic side elevation view of defacing apparatus constructed in accordance with the invention;

FIG. 2 is an elevation view taken along line 2—2 of FIG. 1;

FIG. 3 is a plan view of a knurling wheel used in the defacing apparatus of FIG. 1;

FIG. 4 is an edge view of the knurling wheel;

FIG. 5 is a plan view of a defaced compact disc;

FIG. 6 is a perspective view, partially cut away, of a preferred embodiment of the invention;

DESCRIPTION OF THE PREFERRED EMBODIMENT

Figure 7:
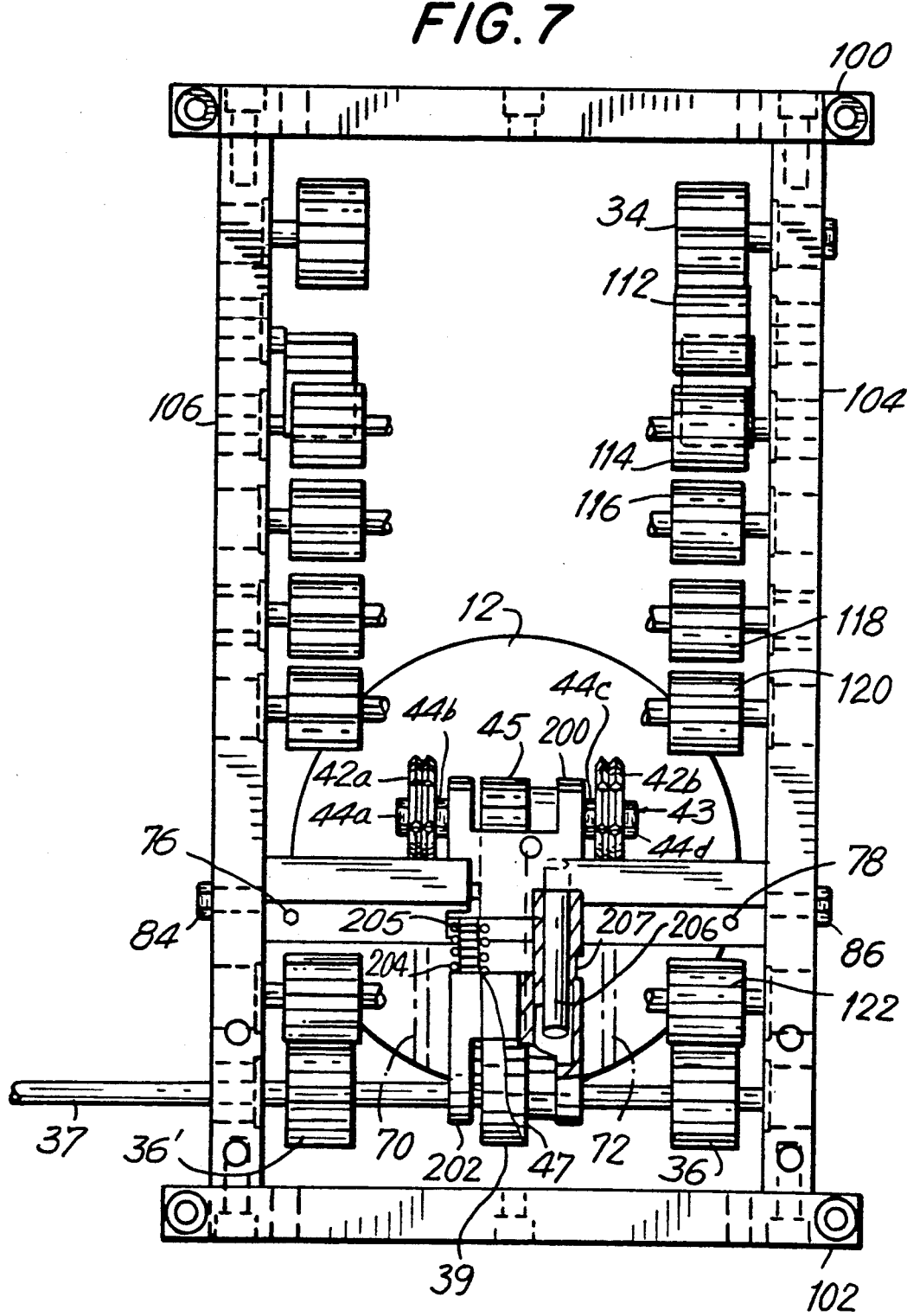
FIG. 7 is an elevation view of the defacing unit as viewed from the right in FIG. 6.

Referring to FIG. 1, the essential components of the defacing apparatus of the invention are a feeder unit 10 for feeding compact discs 12, one at a time, to a defacer unit 14. The feeder unit includes a feed conveyor 16 driven in the direction indicated by the arrow on which CDs to be defaced are placed in random fashion. As the discs reach the end of the conveyor they drop into the open upper end of a cylindrical tube 16 having a diameter slightly larger than the diameter of a CD whereby they stack flat from the bottom of the tube. Periodically, the bottom disc of the stack is pushed horizontally through a slot 18 located at the lower end of tube 16 by a reciprocating plunger 20 and onto a downwardly curved guide 21. The vertical height of slot 18 is only slightly greater than the thickness of the disc so as to allow only one to pass through at a time. The guide 21 is disposed above defacer unit 14 at a location relative thereto such that discs ejected from slot 18 are directed by guide 21 into the defacer unit through a narrow slit 22. Typically, the plunger 20 of feeder unit 10 is timed to deliver CDs to the defacer unit, one at a time, at a rate up to 85 discs per minute.

A falling vertically-oriented disc 12 entering slit 22 is caught and held between two sets of moving belts 26 and 28 driven by a motor (not shown) in the directions indicated by the arrows. As seen in FIG. 2, each set consists of two belts laterally spaced from each other a distance slightly smaller than the diameter of a compact disc; the set 28, visible in FIG. 2, consists of belts 30 and 32 each driven by a respective pair of drive wheels 36 and 36'. Driven wheels 34, 34' are supported on a common shaft 35 and drive wheels 36, 36' are supported on a drive shaft 37; both shafts are journalled in vertically-oriented walls 24a and 24b of housing 24. The other set 26 of belts is similarly constructed. The belts are preferably formed of soft rubber and have transverse grooves or teeth on the inner surface for engaging corresponding grooves or teeth on the periphery of the drive wheels to form two sets of confronting "tractor tracks". The two sets of tracks are mounted just far enough apart that a falling compact disc is caught and firmly held between them for transport through the system, from top to bottom. The belts are driven at a speed such that discs received from the feeder unit are carried through the system without overlap of successive discs.

The two sets of moving belts carry the disc between and past two sets of knurling wheels 42, 44 disposed in the spaces separating the belts of set 28 and of set 26, respectively, and driven at the same rotational speed as the belts so that they simply "roll" over the surfaces of the discs and, accordingly, do not scrape the surfaces. As seen in FIG. 2, set 42 consists of two knurling wheels mounted on a common shaft 43 which is driven in rotation by shaft 37 via a drive belt 39. The other set 44 of knurling wheels is similarly constructed and driven.

The knurling wheels, shown in detail in FIGS. 3 and 4, are preferably made of hardened steel and typically have a diameter of 1¼-inches and a thickness of ¼-inch. So as to produce identifiable grooves in the surfaces of a compact disc, the wheel has a V-shaped peripheral groove 46 having sides oriented at 90° relative to each other, and edges 48 and 50 bevelled at 90° which together define two parallel peripheral knife edges 52 and 54. Additionally, a plurality of V-shaped cross grooves having sides oriented at 90° relative to each other and a depth equal to the depth of groove 46 extend across the knife edges at selected locations distributed along the periphery of the wheel. In particular, advancing clockwise from cross groove 56 located at twelve o'clock, cross groove 58 is angularly displaced therefrom by 45° and, cross groove 60 is displaced 45° from cross groove 58, but the next cross groove 62 is displaced by 90°, and then the next two, 64 and 66, are each displaced by 45° from the next previous groove, followed by a 90° displacement between grooves 66 and 56.

The shafts of the two sets of knurling wheels are each supported on a respective suspension system in opposition to each other so as to engage opposite surfaces of a compact disc as it is transported therebetween by the two sets of belts. As mentioned earlier, the knurling wheels are driven at a speed such that there is no scraping that would mar or obliterate the pattern of the grooves 70 and 72 that the knurling wheels embed in both side surfaces of the disc, as shown in FIG. 5. The suspension systems on which the knurling wheels are supported control the pressure they exert on the disc to insure a consistent depth of plastic displacement sufficient to render the disc unplayable without cracking the polycarbonate substrate. The defaced discs fall from the lower end 74 of the defacer unit onto a conveyor 76 which carries them to a collection receptacle (not shown) for future disposal.

Figure 8:
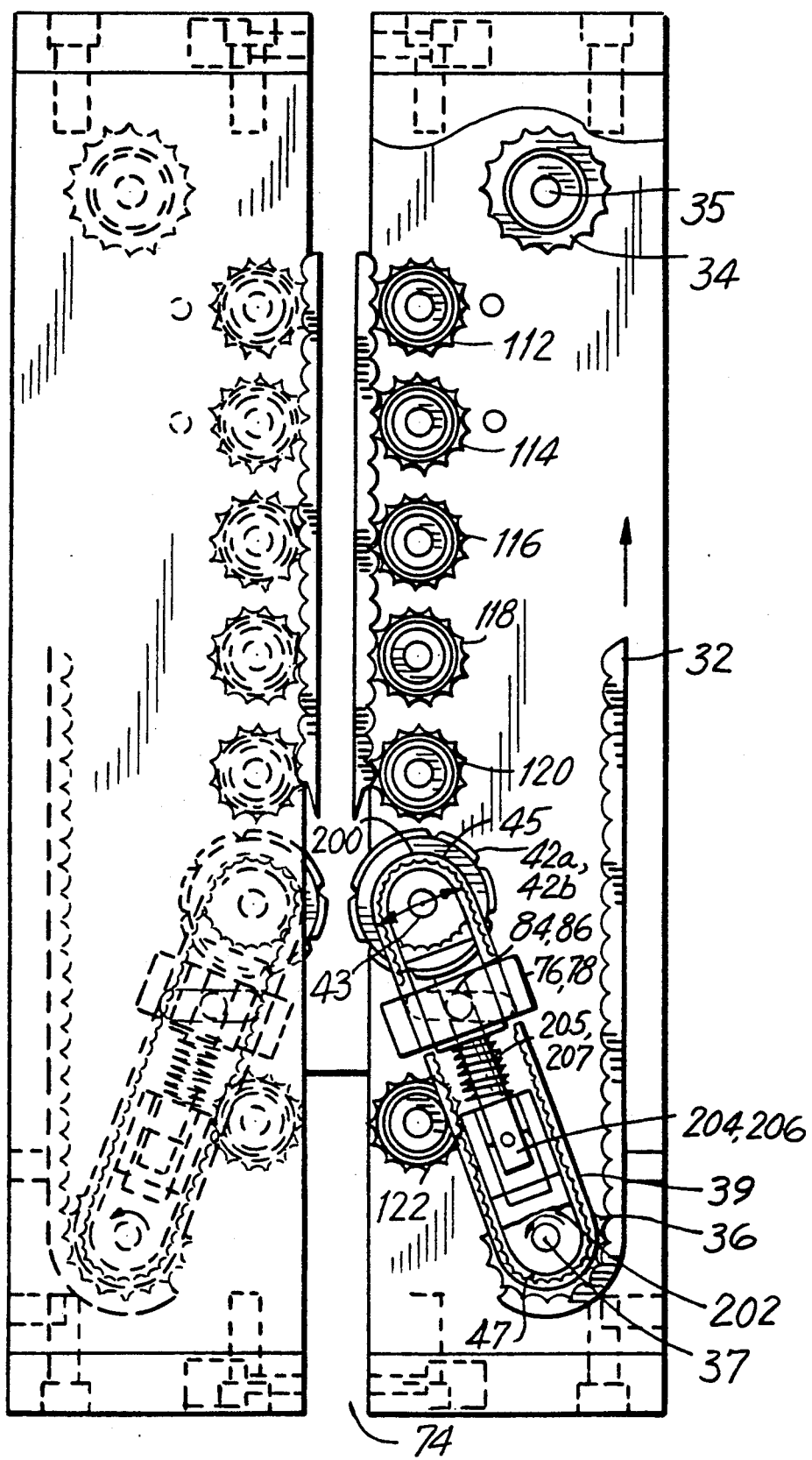
FIG. 8 is a fragmentary elevation side view of the defacing unit shown in FIG. 6.

The CD defacing apparatus diagrammatically illustrated in FIGS. 1 and 2 is preferably constructed as shown in FIGS. 6, 7 and 8, wherein discs delivered by the conveyor 10 drop into the open upper end of a cylindrical vertically-oriented feed tube or magazine 16, the bottom end of which is supported on an annular-shaped member 16a which, in turn, is supported above a horizontally-oriented plate 17 a distance slightly in excess of the thickness of a CD. At any given time the magazine may hold a multiplicity of discs, which are ejected one at a time by a plunger which may take the form of a slide plate 20 supported for back-and-forth movement on a tray 19 from the position shown to a position beneath the magazine. Slide plate 20 pushes the bottom disc of the stack through the narrow slot formed between member 16a and plate 17 which allows only one disc to pass, thereby creating a stripping action. Once a disc has been pushed through the slot it is guided by a downwardly curved extension 21 of plate 17, having upstanding guide plates 21a, 21b and 21c, to the defacing unit, and the slide plate 20 is retracted to allow another disc to drop into place for ejection and the cycle is repeated. The slide plate is reciprocated by suitable actuating means (not shown) at a rate which may be on the order of 85 units per minute.

The falling, vertically-oriented disc is caught and held between two sets of vertically-oriented moving rubber belts which carry the disc between and past two sets of knurling wheels, one set on each side of the disc, and ejects the defaced disc through an exit slit 74. In accordance with an important aspect of the invention, each set of belts and its associated set of knurling wheels are supported on separate, identical, chasses and the two chasses are then bolted together with the two sets of belts facing each other and spaced just far enough apart to define a gap for receiving and positively holding a falling compact disc. More particularly, the chassis disposed to the right of the entrance slot 22 as viewed in FIG. 6, much of which has been cut away for clarity, essentially corresponds to the set of belts 30, 32 and associated knurling wheels 42 shown in FIGS. 1 and 2, and will now be described in detail.

The belts and knurling wheels are supported within a rectangular box-like enclosure defined by top and bottom plates 100 and 102, respectively, bolted to opposite ends of a pair of identical vertically-oriented bearing plates 104 and 106. The side of the enclosure that faces the other chassis is open, and the opposite side may be either open as shown or covered with a plate to minimize entry of dust and debris into the enclosure. The shaft 37 for drive wheels 36, 36' is journalled in bushings inserted in respective openings formed in bearing plates 104 and 106 and is driven in rotation by a variable speed D.C. motor and gear drive (not shown). The shaft 35 for wheels 34, 34', only one of which is visible in FIG. 6, is journalled in bushings inserted in respective openings formed in bearing plates 104 and 106 near the upper ends thereof. While these openings for bushings are not visible in the cut away chassis their relative positions are the same as the openings 108 and 110 in bearing plate 106' of the other chassis and are shown in FIGS. 7 and 8. The preferably toothed drive wheels 36 and 36' engage mating teeth formed on the inner side of respective soft rubber belts 30, 32 and drive them in the direction shown by the arrow. Each belt passes over a respective driven wheel 34, 34' and also over six additional toothed wheels; the belt 32 passes over and engages the wheels 112, 114, 116, 118, 120 and 122 arranged in a group, one above the other, within the enclosure, and belt 30 engages a similarly arranged group of toothed wheels. As shown in FIGS. 7 and 8, correspondingly positioned wheels are mounted at opposite ends of respective common shafts which are journalled in bushings inserted in respective openings formed in bearing plates 104 and 106, the relative positions of which are shown in FIG. 8. These additional wheels in both chasses, firmly support the four belts to stabilize the width dimension of the disc-receiving gap formed by the confronting rubber belts to a value at which the disc 12 is firmly engaged.

The drive wheels 40, 40' of the other chassis are supported on a respective drive shaft journalled in bushings inserted in respective openings formed in bearing plates 104' and 106' and are driven in rotation by the same motor and gear train used to drive shaft 37. As indicated in FIG. 8, drive wheels 40, 40' rotate in a direction opposite to that of drive wheels 36, 36' so as to cause the confronting disc-receiving portion of the belts to move in the same direction and at the same speed.

As best seen in FIGS. 7 and 8, the disc 12 is carried downwardly and past opposed pairs of knurling wheels by the two sets of driven belts. Each knurling wheel assembly consists of a pair of knurling wheels 42a and 42b secured to opposite ends of a threaded shaft 43 by locking nuts 44a, 44b, 44c and 44d respectively, and a toothed wheel 45 keyed to shaft 43. The shaft 43 is journalled in the bifurcate upper end of the top yoke 200 of a double-yoke suspension system, the bottom yoke 202 of which is bifurcated at its lower end. The drive shaft 37 is journalled in the lower end of lower yoke 202 and defines a pivot about which the lower end of the suspension system may rotate. A toothed drive wheel 47 disposed between the arms of the lower yoke and keyed to and driven by drive shaft 37, and a mating toothed belt passing over toothed wheel 45 drives the knurling wheels 42a and 42b.

The upper yoke 200 is coupled to the lower yoke 202 with a pair of parallel shafts 204 and 206 fixed at their upper ends to top yoke 200, their lower ends being guided in bushings mounted in bottom yoke 202. Shafts 204 and 206 are surrounded by compression springs 205 and 207, respectively, so that the upper yoke can move up and down against the compression of springs 205 and 207 thereby to maintain a predetermined tension on toothed belt 39. Because the lower yoke 202 is allowed to pivot about drive shaft 37, the whole knurling wheel assembly also pivots about the drive shaft. However, the extent to which the knurling wheels can move is limited by a pair of blocks 76 and 78, preferably formed of metal, mounted to and extending inwardly from side plates 106 and 104, respectively, each of which has a neoprene spring. The position of blocks 76 and 78, which can be adjusted by bolts 84 and 86 which extend through positioning slots formed in side plates 106 and 108, respectively, determines the initial placement of the knurling wheel suspension, while the neoprene springs allow for limited travel of the knurling wheels from their pre-set position as a disc passes between the opposed sets of wheels.

The system is designed so that the rotational speed of the driven knurling wheels matches the rotational speed of the drive belts, thereby causing the knurling wheels to "roll" over the surfaces of the CD as it is carried between the drive belts; there is no scraping which would tend to mar or obliterate the unique pattern created by the design of the wheels. When properly adjusted, the blocks 76 and 78 maintain the pressure exerted by the knurling wheels at a value to develop this unique pattern with consistent depth in the polycarbonate without, however, cracking the substrate. The defaced discs fall from the exit slit 74 onto a conveyor which carries them to a receptacle for subsequent disposal.

Although the invention has been described with a certain degree of particularity, and as applicable to 4½-inch compact discs, it is apparent that the disclosed concepts are equally applicable to 3-inch CD's as well as other disc-shaped storage media, and that changes in the details of construction and combination and arrangement of parts may be resorted to without departing from the spirit and scope of the invention.

We claim:

1. Apparatus for rendering unplayable information stored on the polycarbonate substrate of a compact disc comprising:
   means for forming a groove of controlled depth in each disc surface including first and second sets of fixed location knurling wheels supported in confronting relationship on respective horizontally-oriented parallel shafts, the confronting peripheries of said knurling wheels being spaced from each other a distance slightly less than the thickness of said substrate; and
   means for vertically orienting and transporting discs, one at a time, to and between said first and second sets of said fixed location confronting knurling wheels, including first and second sets of opposed vertically-oriented moving belts feeding said discs to said wheels, and which define a disc-receiving gap and transport discs downwardly between said knurling wheels, and means for driving said moving belts and said knurling wheels at the same speed whereby said knurling wheels at the same speed whereby said knurling wheels embed grooves in both sides of a disc substrate.

2. The apparatus of claim 1, wherein said first and second sets of knurling wheels comprises two knurling wheels supported in spaced parallel relationship,
   wherein each of said first and second sets of moving belts comprises two belts spaced from each other by distance less than the diameter of a compact disc, and
   wherein each set of knurling wheels is positioned between the two belts of an associated set of belts.

3. The apparatus of claim 2, wherein said first set of knurling wheels and said first set of belts are supported on a first chassis, said second set of knurling wheels and said second set of belts are supported on a second separate chassis, and wherein said apparatus further includes means for securing said first and second chassis together.

4. The apparatus of claim 1, wherein said means for vertically orienting discs further comprises:
   means for stacking with horizontal orientation a multiplicity of discs including a vertically-oriented feed tube having an open upper end for receiving discs and a lower end;
   means for ejecting discs, one at a time, from the lower end of said feed tube; and
   guide means for changing the orientation of ejected discs from horizontal to vertical and guiding the vertically-oriented discs into said disc-receiving gap defined by said moving belts.

5. The apparatus of claim 4, wherein said means for ejecting discs from said feed tube comprises a horizontally-oriented tray on which the lower end of said feed tube is supported, and a slide plate supported on said tray for reciprocal movement relative to said feed tube.

6. The apparatus of claim 3, wherein said means for vertically orienting discs further includes means for stacking a multiplicity of discs comprising a vertically-oriented feed tube having an open upper end and a lower end, means for ejecting discs, one at a time, from the lower end of said feed tube including a slide plate supported for reciprocal movement relative to said feed tube at a uniform rate, and guide means for changing the orientation of ejected discs from horizontal to vertical and guiding the vertically-oriented discs into said disc-receiving gap defined by said moving belts.

7. The apparatus of claim 1, wherein said belts are formed of rubber and each passes over a drive wheel.

8. The apparatus of claim 1, wherein each of said knurling wheels is a thin circular disc having a plurality of cross-grooves distributed in a predetermined pattern around its periphery.

9. The apparatus of claim 1, wherein each of said knurling wheels is a thin circular disc formed of hardened steel having a V-shaped peripheral groove and a plurality of V-shaped cross-grooves of the same depth as said peripheral groove distributed in a pattern around the periphery of the disc whereby to impart an identifiable pattern into said grooves.

10. The apparatus of claim 1, wherein said apparatus incudes means for controlling the depth of said embedded grooves comprising first and second suspension systems each for supporting a respective set of knurling wheels and urging a peripheral edge of said knurling wheels into contact with a respective surface of the disc with a force necessary to maintain the depth of the embedded groove substantially constant without cracking said substrate.

11. The apparatus of claim 3, wherein each of said first and second chassis includes a pair of vertically-oriented bearing plates disposed in spaced parallel relationship;

a drive shaft journalled in and extending between said bearing plates near a lower end thereof for supporting a pair of spaced drive wheels for driving a set of belts;

a driven shaft journalled in and extending between said bearing plates near an upper end thereof having a pair of spaced driven wheels supported thereon and arranged to be driven by said set of belts; and a plurality of idler shafts journalled in and extending between said bearing plates each for supporting a pair of spaced idler wheels, said idler shafts being closely spaced along a vertical line positioned relative to said drive and driven shafts that the vertically-oriented portions of the belts of said set pass over and are supported by respective idler wheels.

12. The apparatus of claim 10, wherein each suspension system is a double-yoke assembly including a lower yoke supported to pivot about a horizontal axis, an upper yoke supporting a driven wheel and a set of knurling wheels for rotation together about a horizontal axis, a drive wheel supported on said lower yoke and driven by said means for driving said moving belts, an endless drive belt passing around said drive wheel and said driven wheel for driving said knurling wheels in rotation, means connecting said upper yoke to said lower yoke including compression spring means for maintaining a tension in said endless drive belt, and wherein said apparatus further comprises means for positioning said double-yoke assembly at an adjusted position at which the space between said sets of confronting knurling wheels is slightly less than the thickness of a compact disc.

* * * * *